Patented Jan. 16, 1934

1,943,380

UNITED STATES PATENT OFFICE 1,943,380

PROCESS OF MAKING ORTHOCHROMATIC COLLODION-EMULSION DRY PLATES

Theodor Freundorfer and Roman Freundorfer, Munich, Germany

No Drawing. Application February 27, 1932, Serial No. 595,649, and in Germany March 28, 1931

2 Claims. (Cl. 95—7)

Heretofore collodion-emulsions were only used in the wet state in making photomechanical reproductions. The many trials of working the layer of collodion-emulsion in the dry state were not successful in practice, because the layer became horny in drying, with the result that the after-treatment, which is of such vital importance for photomechanical reproductions, became extremely difficult.

In the making of these plates protective colloids, for instance gelatine, gum or albuminates were sometimes used, either in the layer itself, or by pouring them over the layer subsequently. Nor did the employment of preservatives, such as glycerine, sugar or tannic acid in the layer itself or poured thereon, lead to any useful result, as the plates so made tended to the formation of dirt and films or veils.

The process according to the present invention obviates all these defects and attains excellent results with regard to cleanness, good dot formation when screens are used and sensitivity to colour.

The process may be explained more fully by the following examples:

(1) By pouring over an ordinary layer of collodion-emulsion in wet or dry state a dissolved salt of silver oxide of a dye of the phthalein group, for instance fluorescein, eosine and erythrosin with strong excess of alkali and the addition of glycerine, there is obtained after drying in pure air a yellow and yellow-green sensitive layer, which works clearly and cleanly and permits of an after treatment just as with wet plates.

(2) By pouring over an ordinary layer of collodion-emulsion or by pouring over a layer of collodion-emulsion dyed with a pigment of the chinoline group, for instance pinacyanol etc., a mixture of strongly alkaline solution of a salt of silver oxide of a pigment of the phthalein group and of an alcoholic solution of pigments from the chinoline group, such as pinacyanol etc. or also ethyl violet and the addition of glycerine, there is obtained after drying in pure air a layer of excellent panchromatic effect, which possesses the properties needed for the photomechanical reproduction.

(3) By pouring over a layer of collodion-emulsion dyed with a fluorescein-erythrosin or erosine pigment or with a pigment of the chinoline group or with both, a strong alkaline silver solution in the wet state, a layer is obtained which is sensitive to colour according to the dye used and which possesses all the properties needed for photomechanical reproduction.

It was found that with plates made in this manner film or veils may to a greater or less extent be formed by drying in bad air. This disadvantage is removed by adding to the dye solutions described above a protective colloid, for instance gelatine, albumens, an albuminate or gum etc. It has likewise been found that a small quantity of resin has a certain protective effect.

What we claim is:

1. The herein described method of preparing orthochromatic collodion emulsion dry plates, which consists in preparing a collodion emulsion layer containing a silver salt in suspension and a color sensitizing dye, adding to a strongly alkaline silver solution preservatives and protective colloids adapted to maintain the plate in useful condition, and applying said solution to the collodion emulsion layer.

2. The herein described method of preparing ortho-chromatic collodion emulsion dry plates, consisting in preparing a collodion emulsion layer containing a silver salt in suspension, preparing an alkaline silver solution, adding a color sensitizing medium for the emulsion to said solution, adding to said solution preservatives and protective colloids adapted to maintain the plate in useful condition, and applying said solution to the collodion emulsion layer.

THEODOR FREUNDORFER.
ROMAN FREUNDORFER.